United States Patent [19]

Yamaguchi

[11] 3,911,379

[45] Oct. 7, 1975

[54] REVERBERATION DEVICE

[75] Inventor: Kiminori Yamaguchi, Hamamatsu, Japan

[73] Assignee: Nippon Gakki Seizo Kabushiki Kaisha, Hamamatsu, Japan

[22] Filed: July 31, 1973

[21] Appl. No.: 384,289

[30] Foreign Application Priority Data

Aug. 11, 1972 Japan .............................. 47-80554

[52] U.S. Cl. .................... 333/29; 333/70 T; 357/24

[51] Int. Cl.$^{2}$... H03H 7/20; H03H 7/22; H03H 7/36

[58] Field of Search ............... 333/20, 28, 29, 70 T; 84/1.19, 1.21, 1.22, 1.25, 1.26; 357/24

[56] References Cited

UNITED STATES PATENTS

| | | | |
|---|---|---|---|
| 2,128,257 | 8/1938 | Lee et al. | 333/70 T |
| 3,260,968 | 7/1966 | Drapkin | 333/29 |
| 3,700,932 | 10/1972 | Kahng | 307/221 C |
| 3,749,837 | 7/1973 | Doughty | 84/1.25 X |
| 3,809,923 | 5/1974 | Esser | 333/70 T X |

*Primary Examiner*—James W. Lawrence
*Assistant Examiner*—Marvin Nussbaum
*Attorney, Agent, or Firm*—Cushman, Darby & Cushman

[57] ABSTRACT

A plurality of signal delay lines are provided each constituted by a number of bucket brigade devices, the number being different from one line to another and consequently the delaying time being different accordingly from one line to another. An audio signal is inputted to the respective delay lines and outputs from the delay lines are admixed to be a reverberated output signal. The delay times are variable in accordance with a transfer clock frequency applied to the bucket brigade devices.

4 Claims, 11 Drawing Figures

REVERBERATION DEVICE

BACKGROUND OF THE INVENTION

1. Field of the Invention

This invention relates to a reverberation device which permits to vary reverberation time and envelopes as required.

2. Description of the Prior Arts

Conventionally, there is a reverberation device wherein an electric signal is converted into a mechanical vibration by means of an electro-mechanical transducer to be fed to one of a mechanical vibration system such as a coil spring line and at the other end thereof the mechanical vibration is converted back into an electric signal by means of a mechano-electric transducer. Such a device is apt to be easily affected by mechanical vibrations applied from the exterior and its reverberation time is not variable once the spring length is set, furthermore the spring wire diameter and the coil diameter and its material fixedly determine its frequency characteristics, and still furthermore the envelopes of the reverberated outputs are set definitely.

Further to the above, there are found reverberation devices utilizing other elements such as a distributed constant circuit, a concentrated constant circuit, an ultrasonic wave line and an electromagnetic delay line. However those still provide defects as mentioned above and are insufficient for convenient use as reverberation devices for an electronic musical instrument.

SUMMARY OF THE INVENTION

Therefore, this invention concerns a reverberation device overcoming and eliminating such defects found in the conventional devices, thereby providing very suitable devices for reverberation apparatus, especially for a keyboard type electronic musical instruments.

One of the object of this invention is to provide a reverberation device whose reverberation time is variable by utilizing bucket brigade devices such as charge coupled devices as signal delay lines, which devices has a similar function to the known magnetic bulb element in that the delaying time is controllable by changing the clock frequency applied and has a flat frequency characteristic, and wherein the input signal is distributed to a plurality of delay lines and the signals respectively passing through different lines are mixedly taken out at the output ends.

Another object of this invention is to provide a reverberation device wherein the envelopes of the reverberated output are variable as required by locating respective variable attenuators at respective output ends of the respective delay lines and by operating the attenuators.

Still further object of this invention is to provide a reverberation device which gives out a reverberated output added with echo effect and having required frequency characteristic by locating a feedback path from the output end to the input and a filter at the output end.

The more detailed description of the preferred embodiment of this invention is hereinafter discussed referring to the accompanying drawing.

BRIEF DESCRIPTION OF THE ACCOMPANYING DRAWING

FIGS. 1*a*, 1*b* and 1*c* are cross sectional views of a part of a charge coupled device constituting a signal delay line of the reverberation device according to this invention, illustrating the functional operation of the unit element of the charge coupled device;

FIG. 2 is a circuit diagram showing a preferred embodiment of a reverberation device of this invention;

FIGS. 3*a*, 3*b* and 3*c* are schematic cross sectional views of a part of the signal delay line constituted by a charge coupled device;

FIGS. 4*a* and 4*b* are charts showing signal levels respectively of the input signal to the delay line and of the output signals therefrom;

FIG. 5 is a circuit diagram showing another embodiment of a reverberation device; and FIG. 6 is a circuit diagram showing a still further embodiment of a reverberation device.

DETAILED DESCRIPTION OF THE PREFERRED EMBODIMENTS

A charge coupled device (CCD) used as a signal delay line in this invention is a kind of bucket brigade device and is a novel semi-conductor device disclosed by Mr. W. S. Boyle of Bell Telephone Laboratory (BTL) at the International Solid State Circuit Conference (ISSCC) in 1970, which device permit charges to move freely in two dimensional space and has a memory function.

Figure 1:
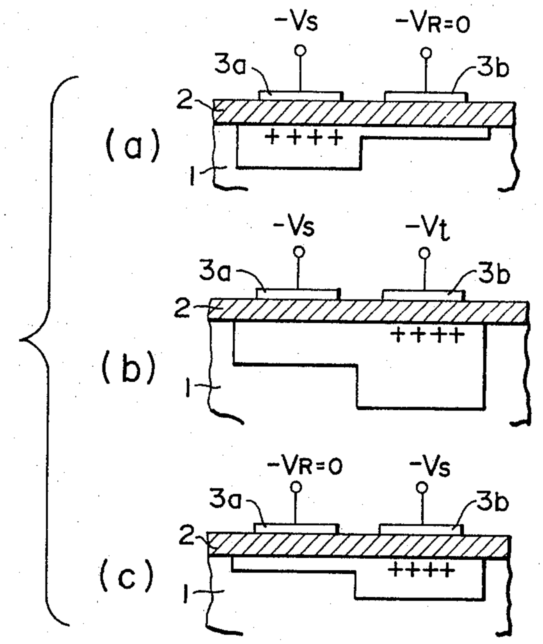

The CCD element is of a construction as shown in FIGS. 1*a*, 1*b* and 1*c*, wherein an N type (or P type) semiconductor substrate 1 is provided on its one surface with a insulation layer 2, on which are provided two pieces of metal electrodes 3*a*, 3*b* per unit element.

In transference of positive holes, a negative voltage $-Vs$ is supplied to one electrode 3*a* as shown in FIG. 1*a* with the semiconductor substrate 1 grounded to the positive side thereby injecting positive holes, then a voltage $-Vt$ ($Vt>Vs$) is supplied to the other electrode 3*b*, whereby the holes start to move from the electrode 3*a* to the electrode 3*b*.

After that, the voltage of the electrode 3*a* is set around the ground potential as shown in FIG. 1*c* and the voltage of the electrode 3*b* is set to $-Vs$, whereby the electric charges due to the aforesaid holes have been transferred spacially from 3*a* to 3*b* and hold now below the electrode 3*b*. Such sequential supply of the voltages to the respective electrodes result in charge transfer from electrode to electrode. If such constructions are serially connected in a plurality numbers, such charges transfer through such number of electrodes until they come out to the output end, thereby delaying electric signals.

Figure 2:
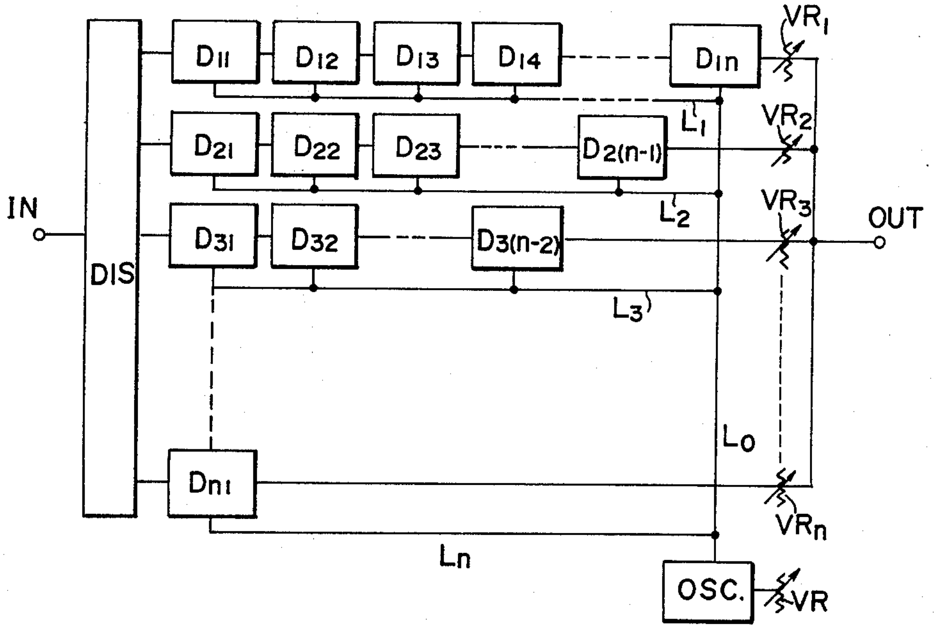

FIG. 2 shows one embodiment of this invention wherein CCD's having abovementioned characteristic are utilized as signal delay lines of different delaying time.

In this embodiment, the reverberation time and the reverberation envelope are variable as required.

In this figure, DIS is a distributor circuit, $D_{11}-D_{1n}$, $D_{21}-D_{2(n-1)}$, $D_{31}-D_{3(n-2)}$ . . . $D_{n1}$ are unit signal delay line elements of the CCD's, OSC is a variable frequency clock pulse or shift pulse oscillator, $VR_1-VR_n$ are variable resistors, (attenuators), $L_0$ through $L_n$ are clock pulse lines, and OUT is an output terminal.

This device comprises a distributor circuit DIS (this can be circuit achieved by merely connecting the input ends of the CCD's in common) receiving an input sound signal from the input terminal $1_n$, and delivering the input signal to each delay line simultaneously. A first delay line is constituted by $n$ pieces of unit delay line elements $D_{11} - D_{1n}$ connected in series, a second delay line by $n$—2 pieces of unit delay line elements $D_{21} - D_{2(n-1)}$ in series, a third delayed line by $n$—2 pieces of delay line elements $D_{31} - D_{3(n-2)}$ connected in series, . . . and an $n$-th delay line by a piece of delay line element $D_{n1}$, and to each delay line is supplied (at its each electrode of each element) with a pair of control circuit $L_0 - L_n$ supplying a shift clock pulse of a periodical negative voltage from the variable frequency oscillator OSC (super-audible frequency preferably of 40KHz to 120KHz) through clock pulse lines $L_0$ through $L_n$. There are further connected between the respective delay lines and the output OUT variable resistors $VR_1$ through $VR_n$ (control element of non-linear type is acceptable) setting output levels of the respective lines.

Figure 3:
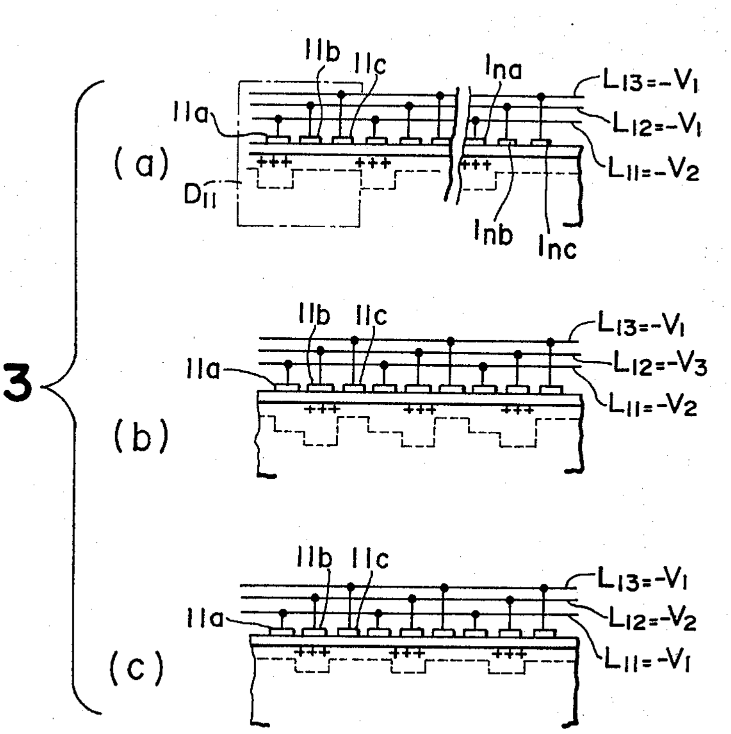

It is acceptable to connect the clock pulse lines $L_1 - L_n$ from the variable frequency clock oscillator to all the signal delaying element $D_{11} - D_{n1}$ in common or in individual from separate oscillators, and to locate n pieces of variable frequency oscillators to n lines thereby feeding each different frequency output per each line. For instance, in FIG. 3, delay line elements $D_{11} - D_{n1}$ constitute a first signal delay line wherein an unit delay line element $D_{11}$ is a portion comprising three electrodes, 11$a$, 11$b$, 11$c$ on the substrate of the N type semi-conductor . . . and in the same way the element $D_{1n}$ also comprises three electrodes $\mathbf{1}_{na}$, $\mathbf{1}_{nb}$, $\mathbf{1}_{nc}$, whereas the electrodes 11$a$ – $\mathbf{1}_{na}$ are connected to the clock subline $L_{11}$, the electrodes 11$b$ – $\mathbf{1}_{nb}$ to the clock subline $L_{12}$, and the electrodes 11$c$ – $\mathbf{1}_{nc}$ to the clock subline $L_{13}$ respectively, so as to supply same control voltage (negative or positive) per same alphabetic-named electrodes among three kinds of electrodes, these three sublines $L_{11}$, $L_{12}$ and $L_{13}$ constituting the first clock pulse line $L_1$ as shown in FIG. 2. As shown in FIG. 3$a$, when the electrodes 11$a$ – $\mathbf{1}_{na}$ are supplied with a voltage $-V_2$, and the electrodes 11$b$ – $\mathbf{1}_{nb}$ and 11$c$ – $\mathbf{1}_{nc}$ are supplied with a voltage $-V_1$, positive holes are formed below the electrode 11$a$ due to the input sound signal representing the amplitude at that moment (provided that $V_2 > V_1$), and next when the electrodes 11$b$ – $\mathbf{1}_{nb}$ are supplied with $-V_3$ (transmitting voltage $V_3 > V_2$), the existing holes start to be transfered to the right-next electrodes 11$b$ – $\mathbf{1}_{nb}$ as shown in FIG. 3$b$ and further when the electrodes 11$a$ – $\mathbf{1}_{na}$ and 11$c$ – $\mathbf{1}_{nc}$ are supplied with a voltage $-V_1$ and the electrodes 11$b$ – $\mathbf{1}_{nb}$ with a voltage $-V_2$, the holes staying below the electrodes 11$b$ – $\mathbf{1}_{nb}$ are now hold under the electrodes 11$b$ – $\mathbf{1}_{nb}$. In this way the charges are shifted electrode by electrode and after one cycle of voltage application sequence, the holes have moved by three electrodes. Three electrode are used so as to provide unidirectionality to the transference of the holes. The time delay obtained will be T (= electrode number/3 times clock frequency).

Each of the aforementioned unit delay line element (CCD) provides several milliseconds of delaying time, therefore the first delay line provides several tens of milliseconds of delay time when $n$ is selected to be 10, the second delay line provides several millisecond shorter delay time than that of the first, . . . and the $n$-th line the shortest delay time of several milliseconds. Such delay time is variable in accordance with the clock pulse frequency.

Figure 4:
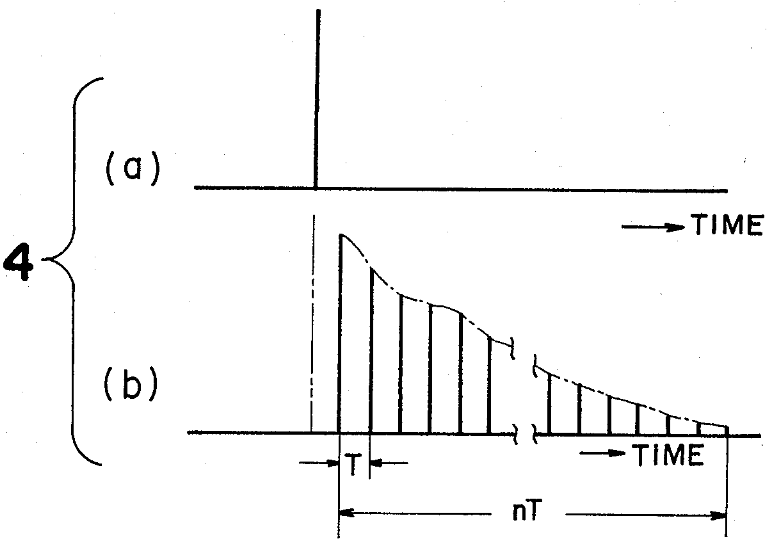

Consequently, when a pulsive input as shown in FIG. 4$a$ is supplied to the input terminal IN, an output having a reverberation envelope, for example, as shown in FIG. 4$b$ is taken out from the output terminal OUT.

In the above case, its interval T of each pulsive output is a several milliseconds and consequently the output sounds are recognized by human ears as continuous reverberated sounds. The illustrated envelope is obtained when the variable resistor is set from $VR_1$ to $VR_n$ to be of smaller values, whereas any required envelope of the reverberated sounds can be obtained by setting the variable resistors $VR_1 - VR_n$ at the given values. The reverberation time $Tw$ is $n$ times $T$, where $T$ is a delay time in one unit delay line element (number of electrodes/3 times clock frequency = several milliseconds), which means the $T$ is determined by the clock pulse frequency of the clock pulse oscillator OSC.

Figure 5:
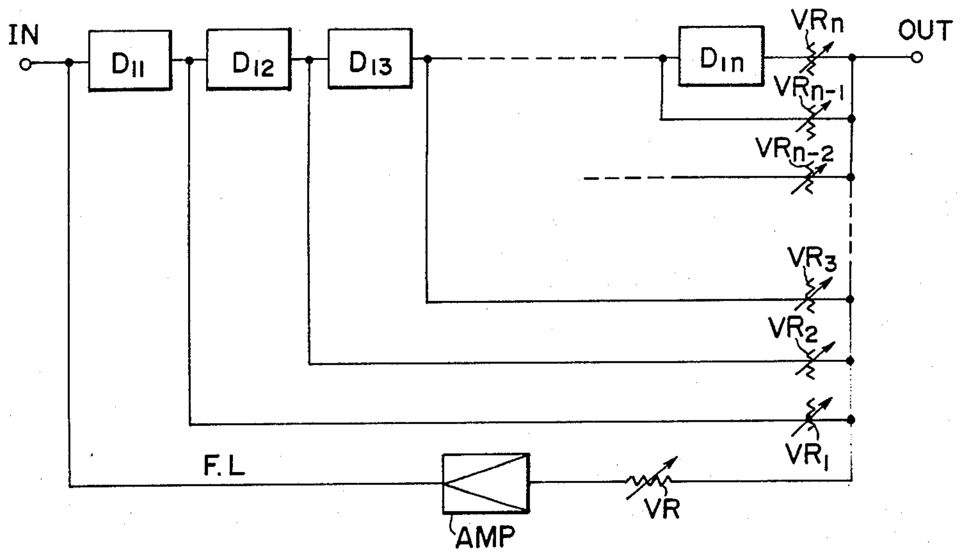

FIG. 5 shows another embodiment of this invention wherein same reference characters with those of FIG. 2 denote identical or similar parts. This is of a more simplified construction of the reverbration device shown in FIG. 2.

This device compises: an input terminal IN receiving an input sound signal and its output terminal OUT, wherebetween n number of unit delay line elements are connected in series thereby constituting a signal delay line with branch outputs taken out from the respective elements $D_{11} - D_{1(n-1)}$; variable resistors $VR_1 - VR_n$ respectively at the sides of the branch outputs thereby connecting output ends of the variable resistors $VR_1 - VR_n$ jointly to the output terminal OUT; and furthermore a feedback path FL between the output terminal OUT and the input terminal IN via VR and an amplifier AMP. Although not shown, there are provided clock pulse lines supplying clock pulse signals which determine the delaying times from the variable frequency oscillator to the respective delay line elements.

According to the operation of this embodiment without the feedback path FL, an output having a reverberation envelope as shown in FIG. 4$b$ is obtained just like by the embodiment of FIG. 3.

However, by the addition of the feedback path FL, such reverberation output pattern as shown in 4$b$ is repeated (repetition period being $T + t$, where t is a delay time in the feedback path) and taken out from the output terminal OUT. In other words, if the device is so arranged to be a back coupling oscillator as a whole with the feedback path FL, more complicated reverberation will be continuously obtained with a satisfactory echoing effect. The condition for oscillation of the back coupling is that its loop gain is 1 or more and its phase change is zero degree. Accordingly, the above condition is accomplished by operating a variable resistor or changing an amplification factor of the amplifier in the path correctly as required. If the device is set at an attenuating oscillation state, for example by operating a variable resistor VR in the feedback path so as to make the loop gain to be smaller than 1, a reverberated of an attenuating vibration with a satifactory echo effect is obtained. Further, if variable delay line circuit is provided in the feedback path, then the repetition period of the reverberation pattern is variable.

Figure 6:
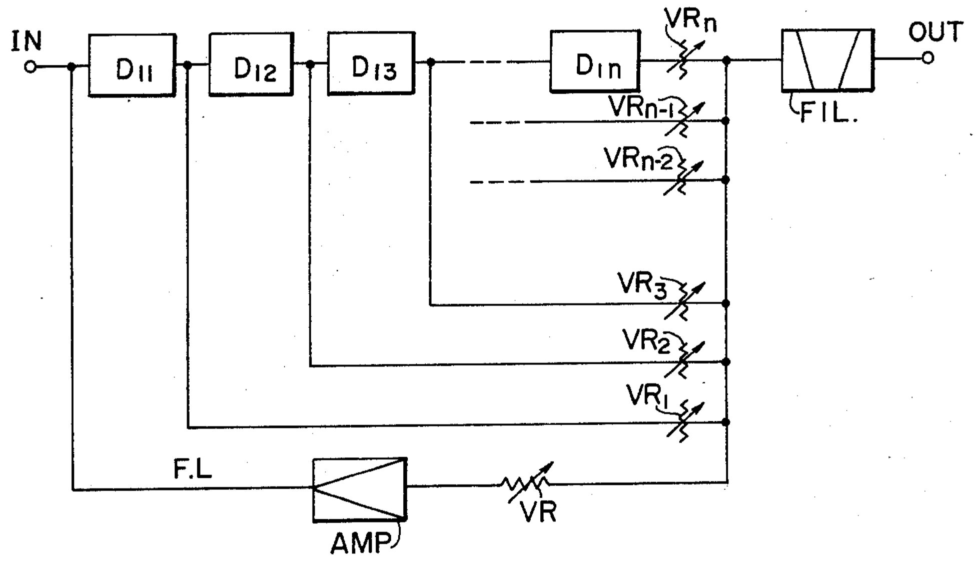

FIG. 6 shows a still further embodiment of this invention wherein a band pass filter is inserted at the output end of the circuit shown in FIG. 5 and the rest portions are as same as those in FIG. 5. By adding a band pass filter FIL at the output reverberated signals having a certain frequency characteristic is obtained. Although FIG. 6 shows an embodiment with a single additional filter, it is also permitted to locate a plurality of filters having different pass-band frequencies in parallel and to switch over the connection thereof at the output ends or the input ends of the filters, whereby various reverberation characteristics are available.

As described above, since this device is provided with a plurality of delay line paths having a plurality of delay line elements whose delaying times are variable according to the exterior signal, for example, CCD in series, the outputs and the inputs of the paths are respectively connected in common and different number of delay line elements are provided in the respective paths, the outputs from the respective paths are variable as required, and a filter or a feedback path is provided at the output end, therefore its reverberation time and envelope of the reverberated output signal can be varied as required, a required frequency characteristic can be obtained, and also the reveration output with a satisfactory echo effect and the repeated output of the reverberation signal can be obtained.

Furthermore, the device is very likely to be constructed by the integrated circuits thereby permitting a compact type device.

What is claimed is:

1. A reverberation device comprising an input terminal, an output terminal, a plurality of signal delay lines each having delaying elements whose delaying time is variable in series therein, output and input ends of said lines being respectively connected in common respectively to said input terminal and said output terminal, each of said plurality of signal delay lines comprising a semiconductor substrate having an insulating layer formed thereon and having a plurality of electrodes formed on the insulating layer to form a plurality of charge coupled device elements which function as said delaying elements, the numbers of said delaying elements in the respective lines being different from each other, clocking means for applying clocking signals to the electrodes of said charge coupled device elements, and output level varying elements connected at the outputs of said respective lines.

2. A reverberation device comprising an input terminal, an output terminal, a signal delay line having a plurality of delaying elements whose delaying time is variable connected in series between said input terminal and said output terminal, said signal delay line comprising a semiconductor substrate having an insulating layer formed thereon and having a plurality of electrodes formed on the insulating layer to form a plurality of charge coupled device elements which function as said delaying elements, branch paths respectively connected to the respective ones of said delaying elements, and output level varying elements connected in the respective ones of said branch paths, the output ends of said output level varying elements being connected in common to said output terminal.

3. A reverberation device according to claim 2, including a feedback path connected between the output terminal and the input terminal, said feedback path including an adjustable impedance element for adjusting the amount of feedback.

4. A reverberation device according to claim 3, wherein there is further connected a band pass filter at the output terminal.

* * * * *